United States Patent
Orr et al.

(10) Patent No.: US 11,232,465 B2
(45) Date of Patent: Jan. 25, 2022

(54) CHURN PREDICTION WITH MACHINE LEARNING

(71) Applicant: Airship Group, Inc., Portland, OR (US)

(72) Inventors: Elizabeth Marjory Orr, Portland, OR (US); Gary Todd Johnson, Portland, OR (US); Neel Banerjee, Portland, OR (US)

(73) Assignee: Airship Group, Inc., Portland, OR (US)

( * ) Notice: Subject to any disclaimer, the term of this patent is extended or adjusted under 35 U.S.C. 154(b) by 1025 days.

(21) Appl. No.: 15/646,008

(22) Filed: Jul. 10, 2017

(65) Prior Publication Data

US 2018/0018684 A1    Jan. 18, 2018

Related U.S. Application Data

(60) Provisional application No. 62/362,001, filed on Jul. 13, 2016.

(51) Int. Cl.
| | | |
|---|---|---|
| *G06N 7/00* | (2006.01) | |
| *G06N 20/00* | (2019.01) | |
| *G06Q 30/02* | (2012.01) | |

(52) U.S. Cl.
CPC ......... *G06Q 30/0202* (2013.01); *G06N 7/005* (2013.01); *G06N 20/00* (2019.01)

(58) Field of Classification Search
CPC ..... G06Q 30/0202; G06N 20/00; G06N 7/005
See application file for complete search history.

(56) References Cited

U.S. PATENT DOCUMENTS

| | | | | |
|---|---|---|---|---|
| 2007/0185867 A1* | 8/2007 | Maga | ...................... | G06F 16/24 |
| 2011/0295649 A1* | 12/2011 | Fine | ................... | G06Q 30/0201 |
| | | | | 705/7.29 |
| 2015/0242762 A1* | 8/2015 | Cox | ................... | G06Q 30/0621 |
| | | | | 706/11 |
| 2016/0203509 A1* | 7/2016 | Sharp, III | .......... | G06Q 30/0244 |
| | | | | 705/14.43 |
| 2017/0220933 A1* | 8/2017 | Gonguet | .............. | G06Q 10/101 |

OTHER PUBLICATIONS

Lazarov et al., "Churn Prediction," (2007) (Year: 2007).*
Hadiji et al., "Predicting Player Churn in the Wild," IEEE (2014) (Year: 2014).*
Xie et al., "Predicting Player Disengagement and First Purchase with Event-Frequency based Data Representation," IEEE CIG (2015) (Year: 2015).*

(Continued)

*Primary Examiner* — Baboucarr Faal
*Assistant Examiner* — Kevin L. Smith
(74) *Attorney, Agent, or Firm* — Fenwick & West LLP (57) ABSTRACT

Disclosed is a churn prediction system that predicts with a high level of accuracy which users will and which users will not stop opening the app over a 30-day time period. To this end a model is created using historical event data where the churn-related behavior of each user is known. New event data is then applied to the model to determine the likelihood of each user churning in the future. With these prediction scores a user is then qualified as falling into one of three classifications: low-risk, medium-risk, or high-risk of churn.

20 Claims, 5 Drawing Sheets

(56) References Cited

OTHER PUBLICATIONS

Khan et al., "Applying Data Mining to Customer Churn Prediction in an Internet Service Provider," Int'l Journal of Computer Applications (2010) (Year: 2010).*

Khan et al., "Behavioral Modeling for Churn Prediction: Early Indicators and Accurate Predictors of Custom Defection and Loyalty," (2015) (Year: 2015).*

"Tutorial: Build and End-To-End Churn Prediction Model," Dataiku, 2012-2017, 20 pages, [Online] [Retrieved on Jul. 27, 2017] Retrieved from the Internet<URL: https://www.dataiku.com/learn/guide/tutorials/churn-prediction.html>.

* cited by examiner

CHURN PREDICTION WITH MACHINE LEARNING

CROSS-REFERENCE TO RELATED APPLICATIONS

This application claims a benefit of U.S. Provisional Application No. 62/362,001, filed Jul. 13, 2016. The content of the foregoing is incorporated, herein, by reference in its entirety.

TECHNICAL FIELD

The disclosure relates generally to the field of user relationship management, and more specifically to user churn prediction.

BACKGROUND

Churn prediction is an application of data science and machine learning used to model a likelihood of who may leave behind one product or service after a period of time. For example, churn prediction may be used to determine when someone leaves one product or service for an alternative product or service.

Another example of where churn prediction is applied is in the field of mobile device applications (mobile apps). It is estimated that a large number (e.g., almost 80%) of users of mobile apps stop using a mobile app within 30 days of initially downloading and/or initially engaging with that mobile app. Understanding which users are likely to leave behind (e.g., churn) usage of that mobile app may be useful to evaluate to determine how to increase user retention with regard to being engaged with the mobile app. That is, determining which users are likely to churn may enable businesses to better engage their users, understand which mobile app attributes are associated with churn, and enhance customer relationship management.

SUMMARY

An example embodiment includes a churn prediction system, method, and/or program code (software and/or firmware) that analyzes for churn with a high degree of accuracy. For example, a churn prediction system (CPS) predicts, with a high level of accuracy, if a user will not stop opening an application or will stop opening an application associated with a customer over a future 30-day time period. By way of example, a user that will stop opening the application is classified as having churned and a user that will not stop opening the application is classified as not having churned.

The CPS generates a model based on historical event data from a plurality of other users of the application associated with the customer wherein inputs to the model comprise feature vector. In an embodiment, the output of the generated model is a likelihood of churn. The historical event data includes the churn related behavior of each of the other users. Based on the historical data, the churn prediction system extracts a feature vector for each of the plurality of other users. The extracted feature vectors are classified into a positive training set and a negative training set. In one or more embodiments, the CPS trains the generated model using the positive and negative training set.

The CPS retrieves historical event data associated with the user and extracts a feature vector from the historical event data. The CPS applies the extracted feature vector to the trained model as an input and determines a likelihood of churn associated with the user. In some embodiments, the CPS additionally determines a risk of churn associated with the user. In still other embodiments, the CPS receives a set of users and the CPS generates a report indicating a percentage of the set of user that have a high, medium, and low risk of churn in a future time period.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
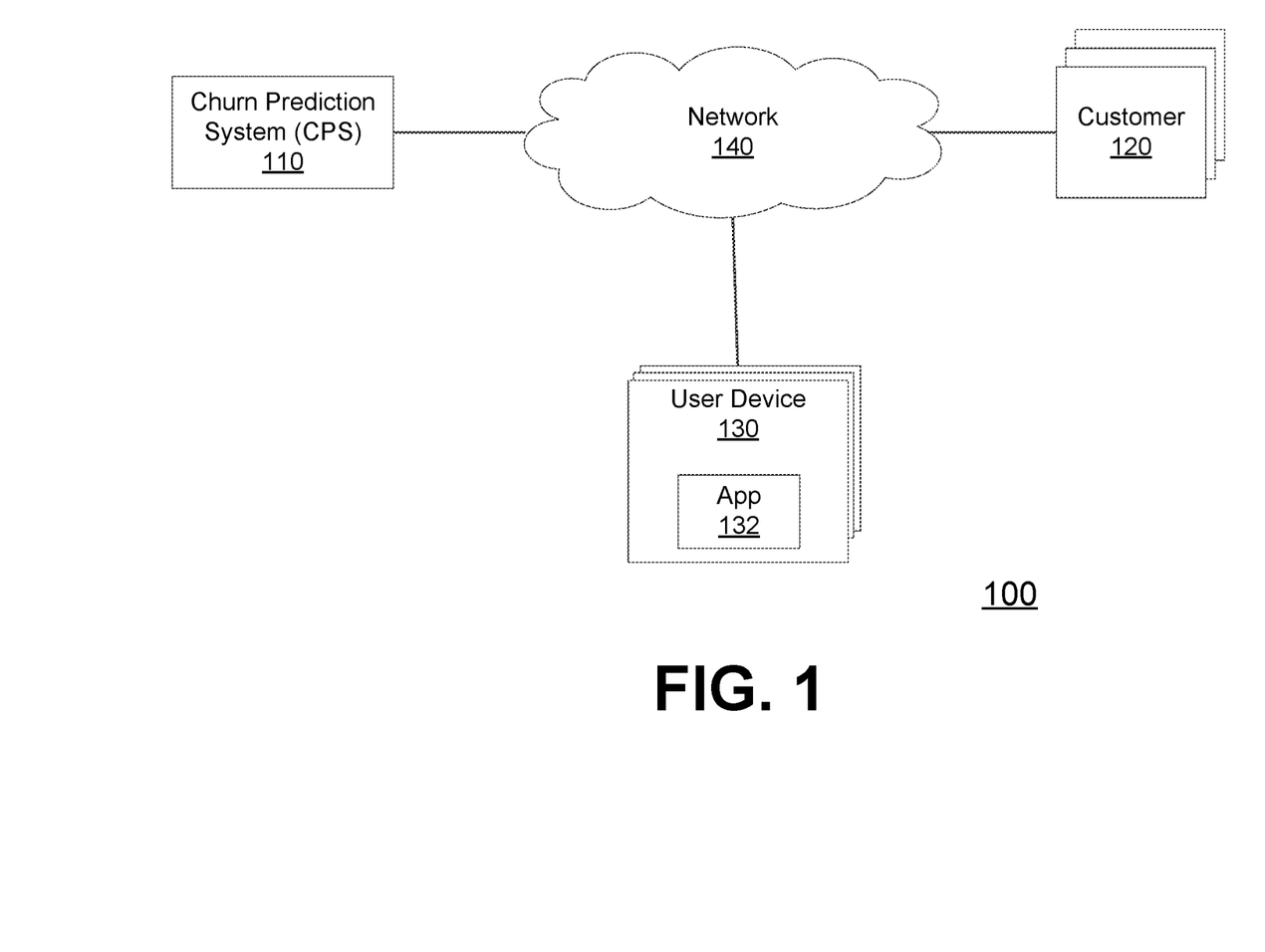
FIG. 1 shows a system environment in which a churn prediction system operates, in accordance with an example embodiment.

FIG. 1 illustrates a system environment in which a churn prediction system operates, in accordance with an example embodiment. The computing environment of FIG. 1 includes a churn prediction system (CPS) 110, one or more computing devices associated with a customer 120 (customer device 120), one or more user computing devices (or user device) 130, and a network 140. In various embodiments, each of the one or more customer devices 120 is associated with a customer of the CPS 110 and each of the one or more user devices 130 is associated the customer. In various embodiments, each of the one or more CPS 110, the one or more customer devices 120, and the one or more user devices 130 include additional, fewer, or different components for various applications. Conventional components such network interfaces, security functions, load balancers, failover servers, management and network operation consoles, and the like are not shown as to not obscure the details of the system architecture.

The CPS 110 provides a level of risk of churn associated with each of the one or more user devices 130 to the one or more customer devices 120. In some example embodiments, each of the one or more user devices 130 is associated with a user, e.g., through a user account, associated with a customer device 120 and the CPS 110 proves a level of risk of churn associated with the user to the customer device 120. In other example embodiments, the one or more user devices 130 may be associated with a single user and the CPS 110 provides a level risk associated with each user associated with the one or more customer devices 120. The CPS 110 may include one or more server computers. In various embodiments, the CPS 110 receives one or more of a user identifier, and an application identifier from each of the one of the one or more customer devices 120. The CPS 110 may generate a level of risk associated with each of the one or more user devices 130. A user device 130 may be associated with a user (or a user account) that may engage with a service or good from a customer through the customer device 120. The customer device 120 may provide for an interface for interaction, e.g., a web site or application (app). It should also be noted that references made herein to user and customer are understood to be referring to a interactions from user of via a user device 130 and interactions from a customer via a customer device 120, respectively. The customer may be, for example, a gas station such as PETROL, INC. or a retail store such as LATTE, INC, each interacting through their respective customer device 120. The user interacts with its user device 130 to be a user of service or product offered by the customer. For example, a user may be someone who buys, e.g., via the user device 130, gasoline from PETROL, INC. or coffee from LATTE, INC. (e.g., transaction via the customer device 130). A user may be an entity, e.g., an individual user or corporate account, that has one more or more devices (e.g., user device 130) and/or a network enabled object (e.g., software module, IoT device) registered with an app 132. The app 132 may provide the interface for the customer device 120 to interact with the customer. An example of computing configuration corresponding to the devices describe with FIG. 1 is further provided with FIG. 5 below.

CPS 110 stores, in a memory, software, (or computer program product or program code) including a number of code segments for implementing various processes of server systems. For example, the CPS 110 includes code segments for receiving event notifications from one or more user devices 130, storing the received event notifications, receiving request from a customer to determine a risk of a user churning and transmitting the risk of the user churning to the customer device 120 through the network 140. The software, including code segments, is comprised of instructions that can be executed by one or more processors of a computing system (or computing device).

The user device 130 is a computing device. It may be configured to receive user input, display a push notification received via the network 140, as well as generate and transmit event notifications to the CPS 110 via the network 140. In one embodiment, a user device 130 may be a computer system such as, by way of example, a desktop, laptop computer, a tablet, a mobile telephone, a smartphone, a smart watch, an Internet of Things (IoT) device, etc. An example architecture of such devices is described with FIG. 5. In one embodiment, a user device 130 executes an application (e.g., app 132) allowing a user of the user device 130 to interact with the CPS 110 and/or the customer device 120. For example, the user device 130 executes a browser application to enable interaction between the user device 130 and the CPS 110 via the network 140. In another embodiment, the user device 130 interacts with the CPS 110 through an application programming interface (API) running on a native operating system. The native operating system that provides an interface between the hardware components of the architecture and software (e.g., applications or apps) that executes through the operating system. For example, the laptop or desktop computer system may have a WINDOWS, MAC, or LINUX based operating system. Further by example, the mobile computing devices may have IOS®, ANDROID™, or CYANOGEN operating system.

In some embodiments, a user device 130 is a network-connected device embedded in the physical environment (e.g., building, vehicles, appliances (home or office), etc.) and configured to transmit event notifications to the CPS 110. For ease of discussion a user device 130 configured as a network-connected device embedded in the physical environment is referred to, herein, as an IoT device. That is, in various embodiments, the user device 130 is an IoT device. In other example embodiments, the IoT device is a single board computer with internet connectivity such as the RASPBERRY PI, or a microcontroller based sensing platform such as the ARDUINO UNO imbued with one or more sensors. In various embodiments, the one or more sensors include one or more of a camera, a microphone, temperature sensor, and other sensors that provide additional information about the physical environment. In still other embodiments, the IoT device is connected to one or more output devices such as an audiovisual display (e.g., monitor and speakers) and tactile displays. In various example, embodiments, the IoT device is configured to emit an audio visual display in response to a push notification received via the network 140. In various embodiments, an IoT device connects to the network 140 to provide one or more event notifications to the CPS 110. Here the transmitted event notification comprise a message indicating that a user of the IoT device (e.g., user device 130) interacted with the IoT device and the type of interaction. For example, an IoT device may be a button associated with a customer device 120 such that when a user interacts with the IoT device, the IoT device transmits an event notification indicating that the IoT device was "pressed" to the CPS 110 via network 140. Returning to the previous example, the IoT device may blink the button in response to a received pushed notification from a customer device 120.

The network 140 may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, WiFi, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML), HTTP Secure (HTTPS) or extensible markup language (XML). In some embodiments, all or some of the communication links of the network 140 may be encrypted using any suitable technique or techniques.

In one or more example embodiments, the CPS 110 may be configured to receive an event notification from the user device 130 running an app 132. Here, the app 132 is associated with a customer device 120. In the example of FIG. 1, the user device 130 is a mobile device running an app 132. The app 132 is configured to generate, and transmit (or send) event notification via the network 140. A user device 130 also may be any device that is able to transmit an event notification to CPS 110 via network 140. In some example embodiments, the user device 130 may be a tablet or smart watch computer and the app 132 may be a standalone application or a web browser running on the user device 130 and accessing a website associated with customer device 120 via the network 140. In yet other example embodiments, the user device 130 is an IoT device and the app 132 is a set of instructions (e.g., Arduino code) configured to receive and display a push notification, receive user interaction with the IoT device, generate an event notification, and transmit the event notifications to the CPS 110 via the network 140.

In an example embodiment, an event notification transmitted by the user device 130 may be a message and a destination associated with a customer device 120. In various embodiments, the destination is a network address associated with the customer device 120 such as a customer computer, a proxy server, or other device configured to receive data streams from CPS 110. For example, the destination may be a specified universal resource locator (URL), e.g., www.customer.com/proxyserver. In other embodiments, the destination comprises an application identifier such or an alpha-numeric app-key associated with a customer 120. In the embodiments, previously described, the CPS 110 comprises stores a reference table that associates app-keys and application identifiers with a customer 120. In some embodiments, a customer is associated with more than one application.

The message associated with the event notification, received by CPS 110, may include an event descriptor. The event descriptor, associated with the message, may include at least one of an open event, a send event, or any combination thereof. An open event may be associated with a user behavior event. User behavior events may include an "app open" event, an "app close" event, or other custom events defined by a customer device 120. In other embodiments, the event descriptor also may be a user location event such as a geolocation associated where the event occurred. In alternate or additional embodiments, open events comprise information transmitted from the user device 130 to the CPS 110 such as sensor data on changes to room temperature or lighting. Send events comprise data that is received from an online service (e.g., customer 120 or CPS 110). The send event may be associated with a user engagement event. Example send events include a "push," a "push send," an "in app display," a "wallet object install," or a "wallet object remove." In other example embodiments, send events additionally or alternatively include a configuration update based on device behavior and send events may be specific to the type of user device 130 (e.g., smartphone, tablet, laptop or personal computer, and IoT device). For example, a send event to a user device 130 that is an IoT device such as a smart bulb or a smart thermostat is a change in the ambient temperature and room light, respectively. In other embodiments, send events include other forms of communication between a user associated with the user device and a customer 120. For example, a send event may comprise sending an email, a telephone call, a text message from a customer 120 to the user via a user account and/or a user device 130. In another example, one of an email, a telephone call, and a text massage is sent by the CPS 110. In still other embodiments, event descriptors may include any combination of app life cycle events, user behavior events, user engagement events, user location events. Each event descriptor further includes a timestamp indicating when a user associated with a user device 130 performed the event.

Example Churn Prediction Configuration

Figure 2:
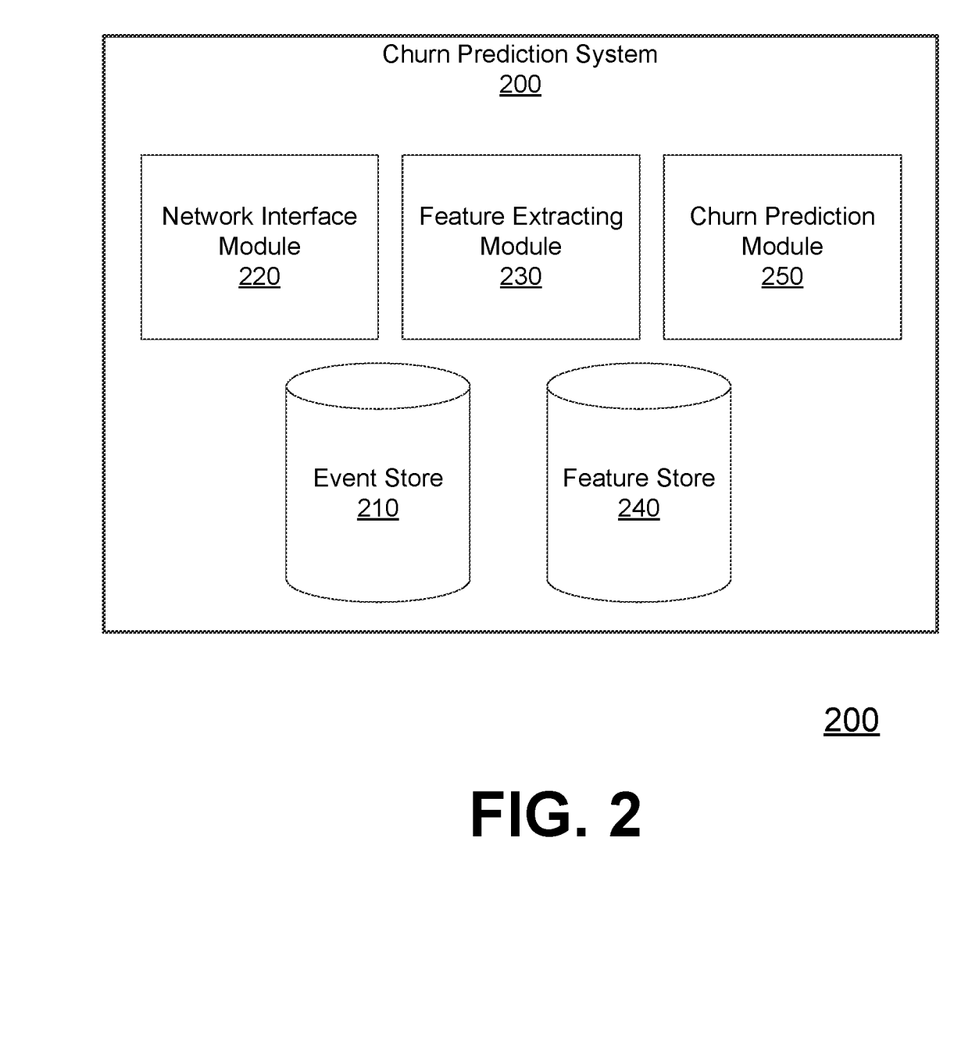
FIG. 2 is a block diagram a churn prediction system, in accordance with an example embodiment.

Turning now to FIG. 2, illustrated is a block diagram of an example embodiment of the CPS 200. The CPS 200 depicted in FIG. 2 may include an event store 210, a network interface module 220, a feature extracting module 230, a feature store 240, and a churn prediction module 250. The components (e.g., modules, stores, databases, balancers) described can be configured in software. The software can be stored in a storage and/or memory of one or more computing devices, for example, as further described with FIG. 5. In addition, the functionality configured through the software may be executed through one or more processors and/or controllers as further described with FIG. 5. The CPS 200 is an embodiment of CPS 110 described above in conjunction with FIG. 1.

The event store 210 may be used by CPS 200 to store event descriptors associated with received event notifications. In an example embodiment, the event store 210 stores events performed by a user on a user device (e.g., user device 130). Examples of event descriptors stored in the event log 230 include event descriptors associated with: open events and send event. Examples of open events include user behavior events (e.g., "tag update", "app open" event, "app close" event.) Examples of send events include user engagement events (e.g., "push send," "in app display", "wallet object install," or "wallet object remove"). The stored event descriptor may additionally be associated with a timestamp. In one or more example embodiments, the stored event descriptors are additionally associated with one or more of: an application identifier or app-key, a user device (e.g., user device 130), and a customer identifier associated with customer device (e.g., customer device 130).

In one or more example embodiments, the event store 210 stores event descriptors and timestamps, user identifiers, device identifiers, application identifiers, and customer identifiers as a <key, value> pair. In one or more example embodiments, the event store 210 stores multiple values with a single key. For example, the key is a device identifier and the value is one or more of: a timestamp, an application identifier or an alpha-numeric app-key, and a customer identifier associated with a customer device (e.g., customer device 120). In one or more embodiments, a single user may be associated with multiple devices (e.g., user devices 130) and the key is a user identifier. The event store 210 additionally or alternatively stores two keys with every stored value (e.g., key 1: device identifier and key 2: user identifier). The user identifier is a unique identifier associated with user. For example, a user identifier is a phone number, an email address, a customer rewards number, or some other form of personally identifiable information. In still other example embodiments, other storage schemes may additionally or alternatively be employed to store an event descriptor associated with a user device in the event store 210.

The network interface module 220 may provide an interface between a network and the CPS 200. The network interface module 220 may include an HTTP server. For example, one or more user devices (e.g., user devices 130) and one or more customer devices (e.g., customer device 120) may communicate with the CPS 200 via the network 140 through the network interface 220. In one or more example embodiments, communications received by the network interface module 220 comprise API requests from a customer device and/or a user device.

The network interface module 220 is configured to receive event notifications from an application associated with a user device via a network (e.g., network 140). In one or more example embodiments, the received event notification may include a received message and a destination. The received event notification additionally may include a timestamp. In various example embodiments, the timestamp indicates a time when the user performed the event on a user device. The network interface module 220 is further configured to parse the message into an event descriptor and a timestamp. In one or more embodiments, the received message additionally includes identifiers such as a device identifier, a user identifier, an application identifier, and a customer identifier. In these embodiments, the network interface module 220 is configured to parse the received message in order to extract each of the identifiers including the event descriptor and the timestamp associated with the received event notification. The network interface module 220 communicates with the event store 210 and stores the parsed message. For example, the message associated with the received event notification is stored as a <key, value> pair. Storage schemes in the event store 210 are further described above in conjunction with event store 210.

The network interface module 220 may receive a request to determine a risk of a user churning. In one or more example embodiments, the received request may include an application identifier, a device identifier. For example, the received request is a request to determine if a user "John" associated with a device identifier: "john123." In other embodiments, the network interface module 220 receives a request, from a client device, to determine the percentage of a set of user devices are at one of a high risk of churning, a low risk of churning, and a medium risk of churning. In the example embodiments described above, the network interface module 220 communicates with the churn prediction module 250 to receive a report indicating a likelihood of churn associated with a single or set of users and/or a report indicating a percentage of a set of users having a high, medium, or low risk of churning. In various example embodiments, the network interface module 220 is configured to transmit the received report via the network 140 to the customer device, e.g., 120.

The feature extracting module 230 extracts features from the event descriptors stored in the event store 210 based on a received time period. Here, the extracted features may be variables deemed potentially relevant a prediction of whether a user associated with a user device is likely to churn. In one or more example embodiments, the extracted features are derived from event descriptors associated with open events and send events. For example, open events occur when a user of a user device 130 opens (e.g., launches or executes) an application 132 on the user device 130 associated with the customer. In another example, an open event occurs when the user "clicks" directly on an icon associated with the application 132 on a user device 130, interacts with a direct link from another source on a user device 130 (e.g., by clicking on a push notification received by the application and displayed on the user device 130), or physically interacts with the user device 103 (e.g., presses on a hardware or software button). Examples of send events include when a customer device 120 sends a push notification to the user device 130. Open and send events are further described above in conjunction with the event store 210.

In one or more example embodiments, features extracted by the feature extracting module 230 comprise one or more count-based features derived individually from events stored in the event store 210 within the received time period. For example, some count-based features include a count of days to the last event (e.g., number of days between a cutoff date and the last time an event occurred), count of days to the first event (e.g., number of days between the cutoff date and the first time the event occurred), count of events (number of events within the time period associated with the received cutoff date), count of days between the first and last event (e.g., number of days between the first event and the last event with the time period associated with the received cutoff date), a unique count of days with even (e.g., the unique number of days on which the event occurred), and/or a windowed count of events (e.g., the count of events that occurred within a time window associated with the received cutoff date). In various embodiments, the feature extracting module 230 generates a time window by counting back the number of days from the cutoff date. For example, time-windows generated by the feature extracting module 230 may be a predetermined number or sequence of times, e.g., 1, 2, 4, 8, 16, 32, and 64 days.

An ordered list of the features for a user associated with a user device is herein referred to as a feature vector. The feature extracting module 230 determines a feature vector for each user device associated with an event descriptor stored in the event store 210. For example, if there are 60 event descriptors stored in the event store 210. In the previous example, if 20 event descriptors are associated with a user device, e.g., 130, associated with "Bob," 10 event descriptors with "Steve," and 30 event descriptors with "Claire," the feature extracting module 230 generates three feature vectors (e.g., one feature vector for each of the 3 user devices). Returning to the previous example, the feature vector associated with "Bob," includes 20 elements, the feature vector associated with "Steve" includes 10 elements, and the feature vector associated with "Claire: includes 30 elements. In one embodiment, the churn prediction module 250 applies dimensionality reduction (e.g., via linear discriminant analysis (LDA), principle component analysis (PCA), or the like) to reduce the amount of data in the feature vector associated with the user.

Training the Machine Learning Model

The churn prediction module 250 applies machine learning techniques to generate a model that when applied to the extracted feature set for a user can predict the likelihood of that user churning within a future time period. In various example embodiments, the future time period is a predetermined (or predefined) time period, e.g., 30 days, in the future. The churn prediction module 250 generates a training set by identifying a plurality of other users associated with the customer device from the event store 210. The churn prediction module 250 assigns each of the plurality of other users a target label (e.g., "churned" or "not churned"). In one or more embodiments, the target label is assigned to each of the plurality of other users based on a timestamp associated with the most recent event descriptor associated with the other user stored in the event store 210.

For each of the plurality of other users, the churn prediction module 250 determines a cutoff date, a first time period, and a second time period. In one embodiment, the cutoff date for each of the identified users is the timestamp associated with the most recent event descriptor associated with the user and stored in the event store 210. The first time period is determined by shifting the determined cutoff date backwards in time. In one example embodiment, determined cutoff date is shifted backwards in time by 30 days and the first time period extends 60 days backwards in time from the shifted cutoff date. The second time period begins at the shifted cutoff date and extends forward in time till the determined cutoff date. That is, the length of the second time period is 30 days and the end date of the first time period is start date of the second time period. In other embodiments, the length of the first time period and the length of the second-time period are predetermined by to best serve the customer's use case by the CPS 200.

In various embodiments, the churn prediction module 250 provides instructions to the feature extracting module 230 to extract one or more features for each of the plurality of other users within a determined first time period associated with the other user. The feature extracting module 230 is further explained above in conjunction with feature extracting module 230. Based on the identified plurality of other users, the churn prediction module 250 generates a positive training set and a negative training. The positive training set comprises one or more of the plurality of other users who churned within the determined second time period associated with the other user. The negative training set comprises one or more of the plurality of other users who did not churn within the determined second time period associated with the other user. The details of predicted the likelihood of a user churning is further described below.

The churn prediction module 250 uses supervised machine learning to train a machine learning model to determine a likelihood of a user churning within the future time period with the generated feature vectors of the positive and negative training set serving as inputs. Different machine learning techniques (e.g., linear support vector machine (linear SVM), neural networks, logistic regression, naïve Bayes, memory-based learning, random forests, or decision trees) along with boosting algorithms (e.g., gradient boosting, AdaBoost) may be used in different embodiments to train a machine learned model. The trained model, when applied to a feature vector extracted from one or more event descriptors associated with a user, outputs an indication of whether the user is likely to churn in the future time period. In one or more embodiments, the generated model generates a Boolean classifier (e.g., "churn" or "not churned") and a scalar value associated with the probability of a churning. In still other embodiments, the churn prediction module 250 also determines the risk of the user churning in the future time period.

In one or more embodiments, the machine learning model is a decision tree. A trained model may include a plurality of decision trees. Each of the plurality of decision trees may include one or more nodes, one or more branches, and one or more termini. Each node in the trained decision tree represents a feature and a decision boundary for that feature. Each of the one or more termini is, in turn, associated with an output score. Generally, each of the one or more nodes leads to another node via a branch until a terminus is reached and an output score is assigned. The output score associated with a terminus of the one or more termini depends on the number of training examples that fall on that terminal branch (e.g., a number of the plurality of other users that are in the positive training set versus a number of the plurality of other users that are in the negative training set). The assigned output score ranges between −1 and +1. Here, a negative value of the output score (e.g., output score <0) indicates that the user is not likely to churn within a time period. On the other hand, a positive value (e.g., output score >0) of the output sore indicates the user is likely to churn within the received time period. For example, if the determined output score closer to 1 indicates that the user has a high risk of churning. Contrarily, a value of an output score closer to −1 indicates that the user has a high probability of not churning.

Determining a Probability of Churn

The churn prediction module 250 determines a probability that a user of a user device 130 will churn within a future time period. As noted above, in one or more example embodiments the future time period is a predetermine time period, e.g., 30 days. The churn prediction module 250 determines a probability that the user will churn by extracting a feature vector associated with the user and using the extracted feature vector as input to the trained machine learning model. The churn prediction module 250 determines a cutoff date associated with the user. In an embodiment, the cutoff date is the timestamp associated with a most recent event descriptor associated with the user stored in the event store 210. For example, if the user most recent event identifier associated with the user and stored in the event store 210 is associated with a timestamp indicating a current date and time, then the cutoff date is the current date and time. In one or more example embodiments, extracting a feature vector comprises determining a third time period and extracting a feature vector based on the stored event descriptors in the third time period. In various embodiments, the third time period comprises an end date that is the determined cutoff date and the third time period has a length of 30 days. The extracted feature vector is used as an input into each of the plurality of decision trees. Here, a feature vector associated with the user comprises providing instructions to extract a feature vector associated with the user including the third time period, to the feature extracting module 230.

In one or more example embodiments, the probability of churn may be determined by calculating an arithmetic sum of the determined output scores associated with each of the plurality of generated decision trees and then using a logistic function to determine the probability. For example, if the generated model comprises 10 individual decision trees, 10 output scores will be calculated for the user. In the preceding example, a probability of churn associated with the user is determined by calculating a sum of all 10 determined output scores and then applying the sum to a logistic function to obtain a probability value between 0 and 1.

In some example embodiments, the churn prediction module 250, additionally, classifies a user as one of a low, medium, or high risk of churning within a future time period. The classification of a user is based on the determined probability that a user will churn, a first threshold value, and a second threshold value. Both the first threshold value and the second threshold value represent probabilities that a user will churn and are both between the values 0 and 1. In an embodiment, the first threshold is numerically smaller than the second threshold. For example, if the first threshold value is 0.33 and the second threshold value is 0.66, a user associated with a probability of churn less than or equal to the first threshold value (e.g., probability of churn <=0.33) is classified as low risk, a user associated with a probability of churn greater than the first threshold value and less the second threshold value (e.g., 0.33<probability of churn <0.66) is classified as medium risk, and a user with a probability of churn greater than or equal to the second threshold value (e.g., probability of churn >=0.66) is classified as having a high risk of churning.

The churn prediction module 250 may generate a report indicating a percentage of a plurality of users having a high, medium, or low risk of churning within a future time period. In these embodiments, the churn prediction module 250 classifies each of the users and then calculates a percentage of the plurality of users that fall into each of the three classifications. For example, if the CPS 200 receives instructions to classify 10 users and determines that 5 of the 10 users have a low risk of churning, 2 have a medium risk of churning, and 3 have a high risk of churning within the future time period, the churn prediction module 250 generates a report indicating that 50% of users have a high risk of churning, 20% of users have medium risk of churning, and 30% of the users have a high risk of churning within the future time period. The generated report may be transmitted to a customer device, e.g., 120, via the network interface module 220 and network 140.

Training and Prediction Example

Figure 3:
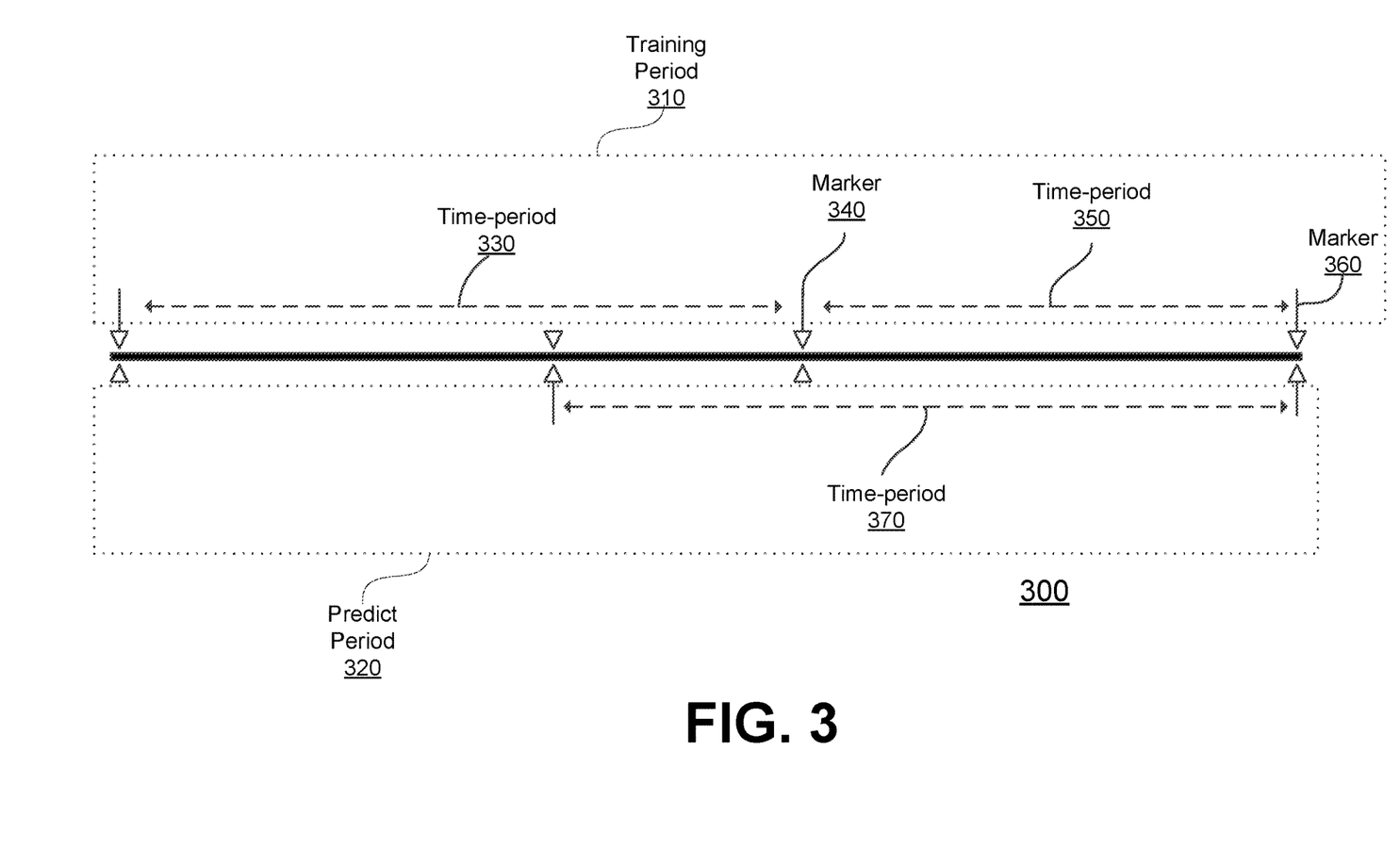
FIG. 3 is a timeline for training a machine learning model and using the trained machine learning model to predict the likelihood of a user churning, in accordance with an example embodiment.

FIG. 3 is a timeline 300 for training a machine learning model and using the trained machine learning model to predict the likelihood of a user churning, in accordance with an example embodiment. For clarity the timeline 300 depicts the training and prediction process for a user associated with just one other user. That is, both the user and the other user are associated with a most recent event descriptor stored in the event store (e.g., event store 210) with the same timestamp. The timeline 300 comprises a training period 310 and a predict period 320. The training period 310 comprises time periods 330 and 360 and markers 340 and 350. The predict period 320 comprises a time period 370 and the marker 360. In the example embodiment depicted in FIG. 3, the marker 340 is the same as marker 360 shifted backwards in time (e.g., by 30 days). Thus, as shown in FIG. 3 marker 360 is a cutoff date associated with the user and the marker 340 is the shifted cutoff date. Both the cutoff date (e.g., marker 360) and the shifted cutoff date (e.g., marker 340) are further described above in conjunction with FIG. 2.

In one or more example embodiments, a time period 330 is determined for the other user. The time period 330 has an end date comprising the marker 340. That is, the end date of the time period 330 is the start date of time period 350. The determined time period 330 is used to extract a feature vector for the other user. The time period 350 is used to determine a target label for the other user (e.g., "churned" or "not churned"). Determining a target label is further described above in conjunction with FIG. 2.

In FIG. 3, the end date of time period 370 is marker 360. In one or more embodiments, the length, in time, of marker 370 is equal to the length in time of time period 330. For example, the length of time period 370 and time period 330 in this example is 60 days. In an embodiment time period 370 may be used to extract a feature vector associated with a user and used as input in the machine learning model to determine a likelihood of the user churning.

Figure 4:
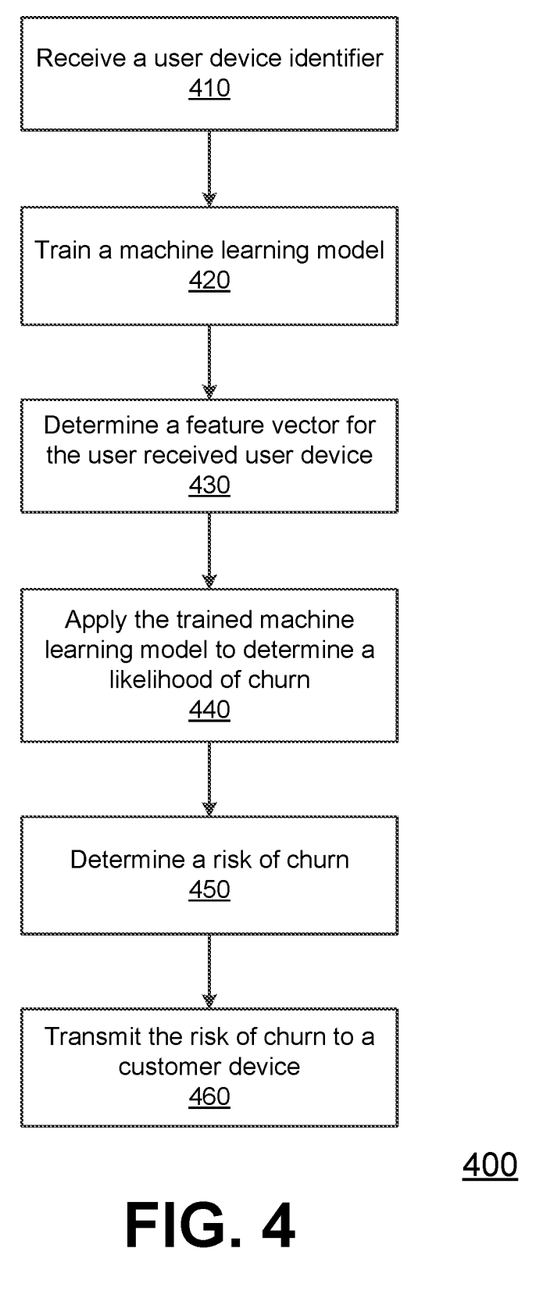
FIG. 4 is a process flow diagram of predicting a likelihood of a user churning, in accordance with an example embodiment.

FIG. 4 is a process flow diagram 400 of predicting a likelihood of a user churning, in accordance with an example embodiment. The process 400 illustrated in conjunction with FIG. 4 may be performed by the CPS 110. In other embodiments, the process 400 may be performed by different and or additional modules.

The CPS 110 receives 410 one or more device identifiers from a customer device 120. In response to having received one or more device identifiers, the churn prediction module 250 identifies a plurality of other users associated with the customer (e.g., customer 120) who have performed one or more events. For each of the plurality of other users, the churn prediction module 250 determines a cutoff date, a first time period, and a second time period. The feature extracting module 230 determines 430 a feature vector based on one or more event descriptors stored in the event store 210 with a timestamp associated with the first time period. The churn prediction module 250 classifies each of the plurality of other users as one of "churned" or "not churned" based timestamps associated with events performed by other user during second time period. Here, the set of other users classified as having "churned" comprise a positive training set and the set of other users classified as having "not churned" comprise negative training set.

The churn prediction module 250 trains 420 a machine learning model based on the positive training set and the negative training set. In one or more embodiments, the machine learning model is a decision tree and training 420 the machine learning model comprises generating one or more decision trees. Decision trees and training is further described above in conjunction with FIG. 2.

The churn prediction module 250 applies 440 the trained machine learning model to determine a likelihood a user associated with the received 410 device identifier churning. In order to apply the trained machine learning model, the churn prediction module 250 determines a third time period and a cutoff date associated with the user identifier. The feature extracting module 230 extracts a feature vector based on the third time period. The extracted feature vector is used as an input to each of the generated one or more machine learning models. The churn prediction module 250 determines an arithmetic sum of the output of each of the one or more machine learning models. The churn prediction module 250 applies the determined arithmetic sum to a logistical function to determine a likelihood of the user associated with the received 410 device identifier churning in a future time period.

The churn prediction module 250 determines 450 a risk of churn associated with the user based on the determined likelihood of a churn. In one or more example embodiments, churn prediction module 250 determines that the risk of churn high if the determined likelihood of churn is larger than or equal to a higher threshold value; and the churn prediction module 250 determines that the risk of churn is low if the determined likelihood of churn is lower than or equal to a lower threshold. Alternatively, if the determined likelihood of churn is higher than the lower threshold value but less than the higher threshold value, the churn prediction module 250 determines that the risk of a user associated with the received 410 device identifier is medium.

The CPS 110 transmits 460 the determined risk of churn associated with the received 410 device identifier to the customer device 120. In embodiment, the transmitted risk of churn includes providing a user interface for display on a customer device 120 to the customer device 120. In an example embodiment, the provided user interface is a graphical user interface (GUI) that displays a determined level of risk of churn as a red, green, blue (RGB) color. For example, a low risk of churn is displayed as the color green, a medium risk of churn is displayed as the color yellow, and a high risk of churn is displayed as red. In still other embodiments, the provided GUI further includes information that may allow a customer associated with a customer device 120 to reduce determined risk of the user churning. For example, the provided information may include a suggestion to select a push notification to be sent to the user. In the previous example, the suggestion is based on a level of risk of churning associated with the user. For example, a high level of risk may be associated with a suggestion to send push notification including a coupon for one or more services.

In other embodiments, the CPS 200 receives one or more user identifiers from a customer device 120 and the steps described above are performed for a single user identifier by the received user identifier. In various embodiments, the CPS 110 receives 410 a set of device identifiers or a set of user identifiers associated with users of a user device 130. In this embodiment, the CPS 110 performs the steps described in FIG. 4 for each of the device identifiers in the set of user identifiers.

Example Computing Architecture

Figure 5:
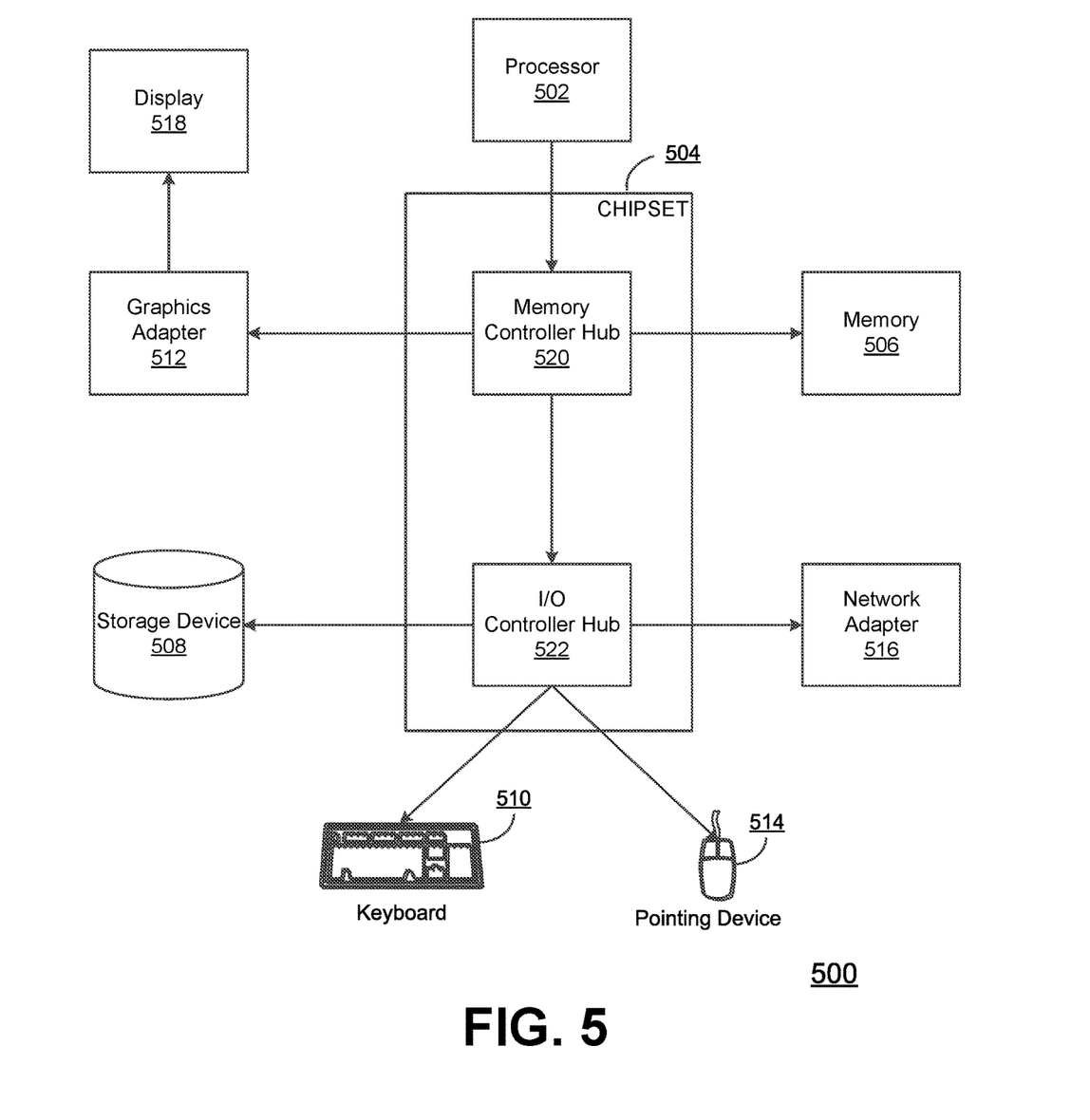
FIG. 5 is a high-level block diagram illustrating physical components of a computer used as part of the churn prediction system, the customer and/or the user according to one example embodiment.

FIG. 5 is a high-level block diagram illustrating physical components of a computer 500. The computer 500 can be used as part or all of the systems described, for example, the CPS 110, the customer device 120, and/or the user device 130 from FIG. 1, according to an example embodiment. Illustrated are at least one processor 502 coupled to a chipset 504. Also coupled to the chipset 504 are a memory 506, a storage device 508, a keyboard 510, a graphics adapter 512, a pointing device 514, and a network adaptor 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds software (comprised of instructions) and data used by the processor 502. The pointing device 514 may be a mouse, track ball, or other type of pointing device, and is used in combination with the keyboard 510 to input data into the computer 500. The graphics adapter 512 displays images and other information on the display 618. The network adaptor 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 618. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. Firmware and/or software can be embodied as program code (or instructions). In one embodiment, program modules are stored on the storage device 508, loaded into the memory 506, and executed by the processor.

Additional Configurations

In additional configurations, the events store 210 comprises a user accounts store and is further configured to track a user's actions across multiple devices and platforms. In these configurations, the user accounts store stores personally identifiable information (PII) about a user including one or more user devices (user devices 130) associated with the user. That is information stored by an accounts store includes one or more device identifiers, a name, an email address, a phone number, a location, and a unique customer identification number (e.g., a member rewards number). In various embodiments, PII is received by the CPS 200 from a customer device 120 and mapped to a user identifier by the CPS 200. The user accounts store may additionally store one or more actions performed by the user in a number of other platforms associated with a customer device 120 (e.g., web site accessible by any computer or a mobile application accessed by a smartphone). In one or more embodiments, the one or more actions are associated with a timestamp and an event descriptor and stored as a <key, value> pair in the events store 210 as described above in conjunction with FIG. 2. While described, here, as part of the event store 210, in other embodiments, the user account store is separate and distinct from the event store 210.

In these configurations, the CPS 200 is configured to train a machine learning model based on the actions and/or events performed by the user and a user associated with a user device on other platforms. Here, the CPS 200 additionally extracts a feature vector associated with the user based on the stored event descriptors and applies the trained machine learning model to the extracted feature vector to predict a probability of churn associated with the user. Training and applying the machine learning model to predict a probability of churn and a risk of churn associated with the user is further described above in conjunction with FIGS. 2 and 3.

In an example embodiment, a user of LATTE INC. who has not gone to a physical location associated with LATTE INC. and ordered a latte in the last 10 days is determined to have a high risk of churn by the CPS 200. In this embodiment, the CPS 200 transmits the determined risk of churn to a device associated with LATTE INC. In various embodiments, LATTE INC. takes corrective actions to reduce the user's risk of churn such as sending an email, a text message, a push notification offering a discount on the user's next latte. Continuing with the example above, a user of LATTE INC. may engage with LATTE INC. through a web site, but not an application on a smartphone. Thus, the CPS 200 determines that the user is associated with a high risk of churn. Accordingly, the CPS 200 may reduce the risk of churn through the web site to engage with the app associated with LATTE INC, for example, by providing an offer redeemable only through the app on the user device 130.

Additional Considerations

The disclosed configurations include the ability to predict the likelihood a user associated with a user device 130 churning in a future time period with high reliability. Additionally, the disclosed configurations beneficially allow for predicting a risk of a churn associated with one or more users of a user device 130. It should also be noted that the CPS 110 also generates a report for display thus enabling a customer associated with the customer device 120 to better may better engage their users, understand which mobile app attributes are associated with churn, and enhance customer relationship management.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and processes data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the described subject matter. Accordingly, the disclosure of the present disclosure is intended to be illustrative, but not limiting, of the scope of the disclosed configuration, which is set forth in the following claims.

What is claimed is:

1. A computer implemented method, comprising:
receiving a device identifier and an event descriptor, wherein the device identifier is associated with a target device, and wherein the event descriptor describes an event associated with an application that occurred for the target device;
identifying historical event data describing events associated with the application that have occurred for a plurality of user devices by a cutoff date, the events including one or more open events and send events;
using the historical event data to train the machine learning model to predict a likelihood of users of the application churning after the cutoff date, the training of the machine learning model comprising, for each particular user device of the plurality of user devices:
determining a shifted cutoff date for the particular user device, the shifted cutoff date being a predetermined time before the cutoff date,
determining a first time period of historical events for the particular user device ending at the shifted cutoff date;
determining a second time period of historical events for the particular user device extending from the shifted cutoff date to the cutoff date;
identifying first event data describing events occurring for the particular user device within the first time period;
assigning the first event data of the particular user device to a positive or negative training set using second event data describing user events occurring for the particular user device within the second time period, wherein the assigning comprises:
responsive to the second activity data indicating the particular user device churned during the second time period, assigning the first activity data to the positive training set; and
responsive to the second activity data indicating the particular user device did not churn during the second time period, assigning the first activity data to the negative training set;
training the machine learning model based on the positive training set and the negative training set generated from the historical event data;
applying, using the event descriptor, the trained machine learning model for determining the likelihood of the target device churning within a future time period after the cutoff date; and
transmitting the determined likelihood of the target device churning.

2. The method of claim 1, wherein the machine learning model is a decision tree comprising one or more nodes, one or more branches, and one or more termini wherein an input to the decision tree is a feature vector associated with the target device and an output of the decision tree is an output score.

3. The method of claim 1, wherein training the machine learning model comprises:
extracting a feature vector for the particular user device based on one or more event descriptors of the first activity data for the particular user device.

4. The method of claim 3, the extracted feature vector comprises one or more features, the one or more features including a count based event.

5. The method of claim 1, wherein applying the trained machined learning model to determine the likelihood of the target device churning comprises:
  determining a second cutoff date wherein the second cutoff date is the timestamp associated with the event descriptor associated with the target device;
  determining a third time period preceding the second cutoff date;
  extracting a feature vector based on one or more additional event descriptors associated with the target device and having occurred during the third time period; and
  applying the extracted feature vector as an input to the trained machine learning model.

6. The method of claim 5, wherein determining the likelihood of the target device churning within the future time period comprises:
  determining one or more output scores by applying the extracted feature vector as an input to the trained machine learning model;
  determining an arithmetic sum of the one or more output scores;
  applying the determined arithmetic sum to a logistical function to determine a probability of churn associated with the target device.

7. The method of claim 1, further comprising determining a risk of the target device churning within the future time period based on the determined likelihood.

8. The method of claim 7, wherein determining the risk of the user device churning comprises:
  determining a first threshold and a second threshold wherein the first threshold is greater than the second threshold;
  responsive to determining that the determined likelihood is greater than or equal to the first threshold, classifying the user device as having a high risk of churn; and
  responsive to determining that the determined likelihood is less than the second threshold, classifying the user as having a low risk of churn.

9. The method of claim 1, further comprising providing, for display a graphical user interface that displays a determined level of risk of churn associated with the target device as a color.

10. A system comprising:
  a processor; and
  a memory comprising stored instructions, the instructions executable by the processor for causing the processor to:
    receive a user identifier and an event descriptor, wherein the user identifier uniquely identifies a target user associated with a target device, and wherein the event descriptor describes an event associated with an application that occurred for the target device;
    identify historical event data describing events associated with the application that have occurred for a plurality of user devices by a cutoff date, the events including one or more open events and send events
    use the historical event data to train the machine learning model to predict a likelihood of users of the application churning after the cutoff date the training of the machine learning model comprising, for each particular user device of the plurality of user devices:
      determine a shifted cutoff for the particular user device, the shifted cutoff date being a predetermined time before the cutoff date,
      determine a first time period of historical events for the particular user device ending at the shifted cutoff date;
      determine a second time period of historical events for the particular user device extending from the shifted cutoff date to the cutoff date;
      identify first event data describing events occurring for the particular user device within the first time period;
      assign the first event data of the particular user device to a positive or negative training set using second event data describing user events occurring for the particular user device within the second time period, wherein the assigning comprises:
        responsive to the second activity data indicating the particular user device churned during the second time period, assign the first activity data to the positive training set; and
        responsive to the second activity data indicating the particular user device did not churn during the second time period, assign the first activity data to the negative training set;
      train the machine learning model based on the positive training set and the negative training set generated from the historical event data;
    apply, using the event descriptor, the trained machine learning model for determining the likelihood of the target user churning within a future time period; and
    transmit the likelihood of the target user churning.

11. The system of claim 10, wherein the memory further comprises stored instructions executable by the processor that when executed causes the processor to determine a risk of the target user churning within the future time period based on the determined likelihood.

12. The system of claim 10, wherein the instruction to train the machine learning model further comprises instructions executable by the processor that when executed causes a processor to:
  extract a feature vector for the particular user based on one or more event descriptors of the first activity data for the particular user.

13. The system of claim 10, wherein the memory further comprises stored instructions executable by the processor that when executed causes the processor to provide for display a graphical user interface that displays a determined level of risk of churn associated with the target user as a color.

14. A computer program product embodied in a non-transitory computer readable storage medium and comprising computer instructions that when executed by a processor causes the processor to:
  receive a user identifier and an event descriptor, wherein the user identifier uniquely identifies a target user associated with a target device, and wherein the event descriptor describes an event associated with an application that occurred for the target device;
  identify historical event data describing events associated with the application that have occurred for a plurality of user devices by a cutoff date, the events including one or more open events and send events
  use the historical event to train the machine learning model to predict a likelihood of users of the application churning after the cutoff date, the training of the machine learning model comprising, for each particular user device of the plurality of user devices:

determine a shifted cutoff date for the particular user device, the shifted cutoff date being a predetermined time before the cutoff date, determine a first time period of historical events for the particular user device ending at the shifted cutoff date;

determine a second time period of historical events for the particular user device extending from the shifted cutoff date to the cutoff date;

identify first event data describing events occurring for the particular user device within the first time period;

assign the first event data of the particular user device to a positive or negative training set using second event data describing user events occurring for the particular user device within the second time period, wherein the assigning comprises:

responsive to the second activity data indicating the particular user device churned during the second time period, assign the first activity data to the positive training set; and responsive to the second activity data indicating the particular user device did not churn during the second time period, assign the first activity data to the negative training set;

train the machine learning model based on the positive training set and the negative training set generated from the historical event data;

apply, using the event descriptor, the trained machine learning model for determining the likelihood of the target user churning within a future time period; and transmit the likelihood of the target user churning.

15. The computer program product embodied in the non-transitory computer readable medium of claim 14, further comprising instructions that when executed causes the processor to determine a risk of the target user churning within the future time period based on the determined likelihood.

16. The computer program product embodied in the non-transitory computer readable medium of claim 14, further comprising instructions that when executed causes the processor to provide for display a graphical user interface that displays a determined level of risk of churn associated with the target user as a color.

17. The computer program product embodied in the non-transitory computer readable medium of claim 14, wherein the instructions to train the machine learning model further comprises instructions that when executed causes the processor to:

extract a feature vector for the particular user based on one or more event descriptors associated with the particular user.

18. The computer program product embodied in the non-transitory computer readable medium of claim 14, wherein the machine learning model is a decision tree comprising one or more nodes, one or more branches, and one or more termini wherein an input to the decision tree is a feature vector associated with the target device and an output of the decision tree is an output score.

19. The system of claim 10, wherein applying the trained machined learning model to determine the likelihood of the target device churning comprises:

determining a second cutoff date wherein the second cutoff date is the timestamp associated with the event descriptor associated with the target device;

determining a third time period preceding the second cutoff date;

extracting a feature vector based on one or more additional event descriptors associated with the target device and having occurred during the third time period; and applying the extracted feature vector as an input to the trained machine learning model.

20. The computer program product embodied in the non-transitory computer readable medium of claim 14, wherein applying the trained machined learning model to determine the likelihood of the target device churning comprises:

determining a second cutoff date wherein the second cutoff date is the timestamp associated with the event descriptor associated with the target device;

determining a third time period preceding the second cutoff date;

extracting a feature vector based on one or more additional event descriptors associated with the target device and having occurred during the third time period; and applying the extracted feature vector as an input to the trained machine learning model.

\* \* \* \* \*